United States Patent Office 2,877,066
Patented Mar. 10, 1959

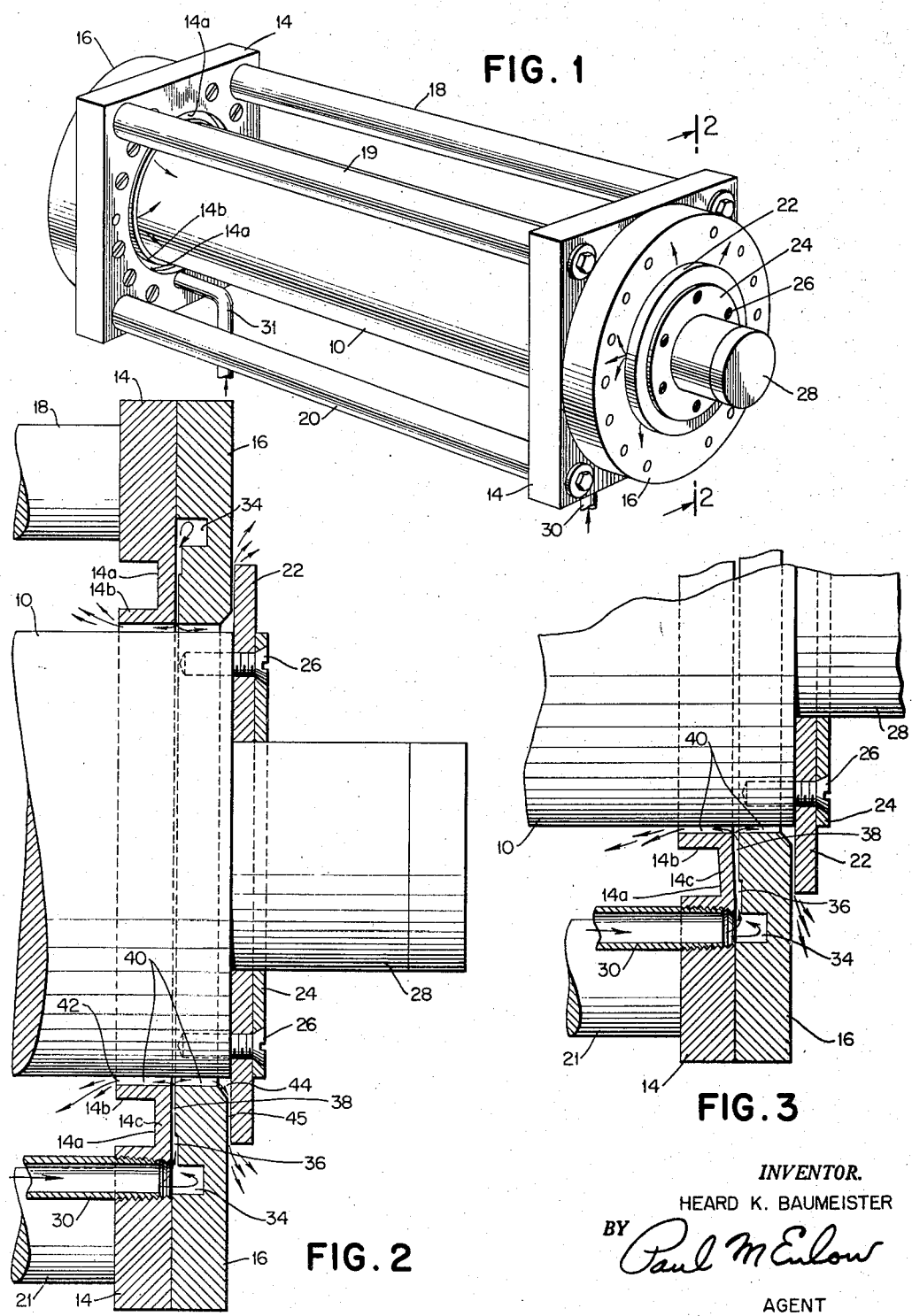

2,877,066
FLUID PRESSURIZED SLEEVE BEARING

Heard K. Baumeister, New York, N. Y., assignor to International Business Machines Corporation, New York, N. Y., a corporation of New York Application September 25, 1956, Serial No. 612,000

8 Claims. (Cl. 308—122)

This invention relates to improvements in fluid pressurized bearings and more particularly to fluid pressurized systems for supporting one member out of contact with another member.

The prior art is replete with fluid pressurized bearings wherein a plurality of lubricating pads are utilized to support a journal out of metal to metal contact with a bearing surface. The prior art also includes numerous devices for controlling the fluid pressure in one or more lubricating pads to counteract an eccentric load applied to a journal. The latter type of fluid bearings frequently require numerous pistons, valves, lengths of thin bore tubing, and other control means which are difficult to adjust and which increase the maintenance and cost problems of a fluid bearing.

The present invention constitutes an improvement over the prior art by not only eliminating the need for a specific number of lubricating pads and their associated fluid feed systems, but introduces a self energized control over the fluid feed system which controls the pressure of the fluid introduced into the bearing.

This invention includes a single continuous lubricating pad or area which exists throughout the entire circumference of the bearing surface. A fluid lubricant under pressure is supplied to the bearing surfaces through a radial slot or passageway which extends circumferentially around the bearing surface. The radial slot is formed by two abutting bearing plates, where a portion of one of the abutting surfaces is recessed. One of said bearing plates includes a resilient member which permits a segment of the opening of the slot to be increased as the spacing between the bearing surfaces is decreased due to eccentric loading of the journal. This action permits increased flow of the lubricant in said slot which increases the pressure between the bearing surfaces, thereby counteracting eccentric loading of the journal by urging the journal towards its normal centered position.

Accordingly, it is a principal object of this invention, to provide an improved pressurized fluid lubricant type of bearing wherein opposing forces are developed at a greater rate in the bearing at points of increased load than that which is customary.

Another object is to provide a bearing having low frictional losses due to the absence of metal to metal contact between the journal and the bearing surface.

A further object is to provide a novel pressurized sleeve bearing which tends to maintain the journal more nearly in the same position with respect to the bearing surface under no-load and full-load conditions.

Another object is to provide a fluid pressurized bearing wherein a portion of the bearing surface is supported by a resilient member which controls the pressure of the fluid lubricant applied to the bearing surfaces.

A further object of the invention is to provide a novel bearing having an annular groove which supplied lubricant under pressure to a bearing surface and wherein the size of the aperture of the annular groove is automatically responsive to provide forces opposing eccentric loads applied to the journal.

Another object is to provide a novel fluid pressurized bearing having an annular groove extending circumferentially about the bearing surface and including a resilient member which controls the pressure of the lubricant being applied to the bearing surfaces whereby the bearing surfaces are maintained out of metal to metal contact and the spacing between said bearing surfaces is maintained substantially constant.

A still further object is to provide a novel pressurized sleeve bearing having a radial ballast resistance extending throughout the circumference of said bearing for automatically controlling the pressure of the lubricant supplied to the bearing surfaces, thereby counteracting eccentric loading of the journal.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a perspective view of a journal supported by the novel bearing at the extremities thereof;

Fig. 2 is a cross section of the novel bearing on line 2—2 of Fig. 1 and illustrates the component parts under no-load conditions; and Fig. 3 is a further sectional view of the novel bearing under loaded conditions.

Referring more particularly to Fig. 1, the drum 10 is shown supported by a pair of identical bearings. The drum 10 constitutes the journal surfaces which extend through the inner bearing plates 14 and the outer bearing plates 16. The inner bearing plates 14 associated with the bearings at the extremities of the drum 10, are rigidly supported with respect to each other by four supporting rods 18–21. The supporting rod 21 connecting the lower right hand corner of the inner bearing plates 14 of Fig. 1 appears only in Figs. 2 and 3.

Each pair of inner and outer bearing plates 14 and 16 are rigidly connected together by suitable pins or bolts. The drum 10 is held within the confines of each of the bearings by a washer 22 and an end flange 24. Each washer and end flange are bolted to the drum by machine screws 26 as is more clearly illustrated in Fig. 2. In other words, the washer 22 limits the longitudinal movement of the drum.

The drum 10 is provided with a shaft 28 which may be utilized to connect the drum to a prime mover for rotating the drum. The prime mover is not illustrated in the drawings since any conventional system may be used to rotate the drum.

A fluid lubricant such as air or oil is supplied under pressure through the tubes 30 and 31 of Fig. 1 to each of the bearings.

Referring more particularly to Fig. 2, a cross section on line 2—2 of Fig. 1 is illustrated. Fig. 2 illustrates the bearing and drum under no-load conditions.

The tube 30 of Fig. 2 is connected to the inner bearing plate 14 and permits the fluid lubricant to pass through the tube to chamber 34. The chamber 34 provides for distribution of the lubricant and comprises an annular groove which extends throughout the entire circumference of the bearing plate. The fluid lubricant contained within the chamber 34 is delivered through an opening or passageway 36 and a narrower opening 38 to the space 40 existing between the bearing surfaces of the inner and outer bearing plates and the surfaces of the journal of drum 10. The opening 36 is formed by cutting away a portion of the outer bearing plate where the cutaway portion extends circumferentially around the inner surface of the outer bearing plate 16. The opening 38 is formed similarly to opening 36 and also extends circumferentially around the inner surface of the outer bearing plate. It is to be noted that the aperture formed at opening 38 by the inner and outer bearing plates is smaller than the opening formed at 36.

The purpose of the radial slot formed by passageways 36 and 38 is to provide a ballast resistor between the distributor or manifold 34 and the spacing 40 between the bearing surfaces. As will be explained hereinbelow, the width of the opening of the slot partly determines the quantity of fluid flowing therein and thus controls the pressure of the lubricant exerted against the journal of the drum.

The fluid lubricant supplied to chamber 34 through tube 30 is applied to the bearing surfaces through the annular passageways 36 and 38 and exhausts at points 42 and 44 (Fig. 2). The lubricant exhausting at point 44 passes through the spacing at point 45 between the outer bearing plate 16 and the washer 22.

The pressure of the lubricant passing through annular slot 38 into the space 40 existing between the bearing surfaces must be sufficient to support the drum 10 out of metal to metal contact with the adjacent surfaces of the bearing plates 14 and 16. The pressure of the lubricant flowing through the space 40 between the bearing surfaces creates a force which counteracts loading forces when applied to the drum. In the unloaded condition, the forces balance each other all around the bearing.

In the portion of the inner bearing plate adjacent to the drum, an annular groove 14a (Fig. 2) is provided which defines a flange 14b. The groove 14a and flange 14b are also shown on the left hand bearing of Fig. 1. The flange 14b (Fig. 2) provides a bearing surface which is adjacent to the journalled surface of drum 10. Due to the annular groove 14a, the portion 14c of the bearing plate which supports the flange 14b, is a resilient member which permits the flange 14b to move in a longitudinal direction parallel to the axis of drum 10. The resiliency characteristics of the member 14c which supports flange 14b are such that the bearing surface of the flange adjacent to the drum 10 remains substantially parallel thereto even when the flange and member 14c experience a large longitudinal deviation compared to the width of the slot 36.

Prior to the application of a lubricant under pressure through tube 30 to reservoir 34 (Fig. 2), the resilient member 14c will be in its most right hand position. This is due to the fact that the lubricant is not flowing and no pressure is developed in the radial slot 36—38. Thus when the pressurized lubricant is supplied to reservoir 34 so that it flows through the radial slot 36—38 to the spacing 40, the pressure within the radial slot presses on the resilient member 14c and thus the flange 14b is moved to the left so that it occupies a normal position as shown in Fig. 2. When load is applied the spacing 40 existing between a predetermined portion of the journal and the bearing surfaces of members 14—16 under the load is decreased, the pressure therein increases thereby causing the resilient member 14c and flange 14b to be forced away to the left so as to permit increased flow of the fluid lubricant and even greater bearing pressures are developed therein. This is shown in Fig. 3. On the other hand, if the spacing 40 is increased at a predetermined portion of the bearing, the unloaded region, the pressure therein decreases thereby permitting the flange and resilient member to be deflected slightly to the right so as to decrease the quantity of fluid flowing within the radial slot 36—38 and even lower bearing pressures are developed therein.

When the journal is substantially centered within the bearing plates 14 and 16, for example, as illustrated in the sectional view of Fig. 2, the lubricant flowing in the reservoir 34 is applied through the radial slot comprising openings 36 and 38 to the space 40 which exists between the bearing surfaces. The pressure drop occurring between the reservoir 34 and the bearing surfaces is substantially constant throughout the circumference of the radial passageway 36—38. Since the spacing is substantially constant throughout the circumference of the bearing surfaces, a lower resistance to fluid flow exists in the spacing between the bearing surfaces. Accordingly, the normal flow of lubricant in the radial passageway 36—38 causes a normal pressure to exist in a lateral direction within the passageway so that a normal force is exerted against the walls thereof. Hence the annular flange 14b and the resilient supporting member 14c will be in the position illustrated in Fig. 2.

Fig. 3 illustrates the bearing under loaded conditions which cause the drum to be non-centered radially. The cross section of Fig. 3 illustrates a portion of the bearing directly beneath the loaded portion of the journal. The application of a load to the journal causes the space at point 40 to be decreased so that the resistance to the flow of a lubricant therein is substantially increased. The increased resistance to fluid flow within space 40 of Fig. 3 causes the pressure therein and the pressure within the passageway 38 to be increased. The pressure within the passageway 38 tends to increase towards the pressure of the lubricant within the reservoir 34. The pressure drop existing between the space 40 and the reservoir 34 thus depends upon the spacing of a particular portion of the radial slot.

Accordingly, the quantity of fluid flowing within the portion of passageway 38 existing immediately beneath the point of load is substantially decreased thereby causing a lateral force to be applied to the walls of the passageway. The force applied to the walls of passageway 38 reacts upon the resilient member 14c thereby causing the flange 14b to be deflected to the left in Fig. 3. The deflection of member 14c and flange 14b causes the volume within passagewy 38 to be increased so that a greater quantity of fluid is permitted to flow therethrough. The increased fluid flow causes the pressure of the fluid flowing into the space 40 between the bearing surfaces to be increased so that a force results which tends to urge the journal towards its normally centered position.

It is to be noted that when the space 40 located beneath the drum is increased due to eccentric loading of the drum, the corresponding space at the top of the drum is increased. In other words, when the drum is loaded in a particular direction so as to decrease the spacing thereat between the bearing surfaces, the spacing at a point diametrically opposite thereto is increased due to the lessening of the load thereat. As noted previously, when the spacing between the journal of the bearing surfaces is increased beyond the normal distance therebetween, the pressure of the fluid flowing in said space is decreased thereby decreasing the pressure within the radial slot. As a result of the decreased pressure within the radial slot, the resilient member and the flange are permitted to move longitudinally to the right so as to decrease the quantity of fluid flowing within the radial slot.

The decreased fluid flow within the slot decreases the pressure applied by the fluid lubricant to the journal thereby permitting the journal to seek its normal radially centered position.

A normal bearing without the resilient part can be made to carry a certain maximum load at the maximum eccentricity. At a small eccentricity the load for the normal bearing will be only a small fraction of the load at the maximum eccentricity. The novel bearing with the resilient part can be made to carry a certain maximum load at the maximum eccentricity. The maximum load for the resilient bearing can be made the same or slightly greater than that for the normal rigid bearing. At a small eccentricity the load for the resilient bearing can be a large fraction of the load at the maximum eccentricity. The load at small eccentricities for the resilient bearing can be made much greater than that for the normal rigid bearing. In other words, the load build up is much quicker in the resilient bearing. The maximum load for the resilient bearing is about the same as for the normal bearing. Consequently, the resilient bearing tends to keep the journal in a more centered position.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A fluid pressurized sleeve bearing comprising the combination of, a journal having a bearing surface, a pair of abutting bearing plates providing a bearing surface adjacent to the bearing surface of said journal, a source of lubricant under pressure, said bearing plates forming an annular aperture communicating said source with the bearing surfaces, and one of said bearing plates defining a resilient annular flange concentric with, and adjacent to said annular aperture, said annular flange accomplishing the adjustment of said aperture in response to an eccentric load applied to said journal.

2. A fluid pressurized sleeve bearing comprising the combination of, a first circular bearing surface, a second circular bearing surface circumscribing said first circular bearing surface and having an annular aperture extending circumferentially around said second circular bearing surface for delivering lubricant under pressure to said first and second circular bearing surfaces, said second circular bearing surface having a larger circumference than said first circular bearing surface to thereby permit relative movement therebetween and to provide resistance to the flow of lubricant from said annular aperture, said second bearing surface including a resilient member forming one side of said annular aperture to permit adjustment of a portion of said aperture in response to a change in load applied to said first bearing surface.

3. An externally fluid pressurized sleeve bearing including the combination of, a rotatable drum having a journal surface, a first rigid bearing member having a first bearing surface parallel to and encompassing a first portion of said journal surface, said first bearing surface being in spaced relationship with said journal surface, a second bearing member abutting said first rigid bearing member and having a second bearing surface parallel to and encompassing a second portion of said journal surface, said second bearing member having a resilient member for supporting the second bearing surface, whereby said second bearing surface is susceptible to movement in a longitudinal direction parallel to said journal surface, said second bearing surface of said second bearing member being formed by the surface of a flange, said flange being formed by an annular recess in said second bearing member, said recess facing a direction opposite to said first rigid bearing member, said first bearing member defining an annular chamber, said chamber being formed by an annular groove cut within the surface of said first bearing member which abuts said second bearing member, means for supplying a fluid lubricant under pressure to said chamber, said first rigid bearing member having a portion of the surface abutting said second bearing member cut away so as to define a channel extending radially from said chamber to the space between said journal surface and said first and second bearing surfaces of said first and second bearing members, the spacing between said journal surface and said first and second bearing surfaces being such as to offer a minimum of resistance to the flow of fluid therein when said drum is disposed in a radially centered position to thereby permit a predetermined quantity of fluid to flow from said chamber through said channel to said spacing whereby said journal surface is maintained out of a metal-to-metal contact with said first and second bearing surfaces, and when said drum is eccentrically located a segment of the circumferential spacing beneath the loaded portion of said drum and between said journal surface and said first and second bearing surfaces is adaptable to offer a maximum of resistance to fluid flow therein thereby causing a maximum pressure to exist within a portion of said channel adjacent to said journal surface so that the lateral pressure within said channel causes said resilient member to be deflected in a lateral direction parallel to said journal surface, whereby the quantity of fluid flowing in said portion of said channel is permitted to increase thereby enabling the pressure within said channel to urge said drum toward its radially centered position.

4. An externally fluid pressurized sleeve bearing including the combination of, a first cylindrical surface, a second cylindrical surface parallel with said first cylindrical surface and formed by a bearing member encompassing said first cylindrical surface, said bearing member defining a circumferential reservoir existing at a greater radius from the axis of said first cylindrical surface than said second cylindrical surface, said bearing member having an annular radial groove for applying a fluid lubricant to the space between said first and second cylindrical surfaces for causing a pressure differential to exist circumferentially between said reservoir and the spacing between said first and second cylindrical surfaces, and said bearing member including resilient means for appropriately increasing or decreasing the quantity of lubricant applied to a portion of the spacing between said cylindrical surfaces when said first cylindrical surface is respectively radially centered and non-radially centered with respect to said second cylindrical surface, whereby the control of fluid flow to said cylindrical surfaces is such as to tend to maintain said first cylindrical surface in a radially centered position with respect to said second cylindrical surface.

5. A fluid pressurized bearing including the combination of, a rotatable surface having a longitudinal axis of revolution, a bearing member having a surface encompassing said rotatable surface and spaced therefrom so that the axis of revolution of the surface of the bearing member is normally coincident with the axis of revolution of said rotatable surface, said bearing member defining a radially extending annular channel which circumferentially connects with the circumferential spacing between said rotatable surface and said bearing surface, means for applying a lubricant under pressure to all portions of said channel whereby a similar pressure differential exists across all portions of said channel about said rotatable surface when the axis of said rotatable surface and said bearing surface are coincident, said bearing member including an annular resilient portion positioned adjacent said radially extending annular channel for controlling the quantity of fluid flow through said channel whereby the quantity of fluid flowing in a portion of said channel is permitted to increase by said resilient member whenever the normal spacing between said rotatable surface and said bearing surface adjacent to said portion of said channel is decreased as a result of the lack of coincidence between the axis of rotation of said rotatable surface and said bearing surface.

6. A fluid pressurized bearing for supporting the surfaces thereof out of metal-to-metal contact including the combination of, a first bearing surface, a second bearing surface parallel to and spaced from said first bearing surface and susceptible to motion with respect to said first bearing surface, said first bearing surface defining a first wall of an annular groove having a predetermined depth and said first wall of said groove extending throughout the circumference of said first bearing surface, means for applying a fluid under pressure to said annular groove, a second wall of said annular groove being formed by a resilient member, and supporting said second bearing surface, for controlling the width of said groove, whereby said resilient member is responsive to a decrease in the normal spacing between said bearing surfaces to cause the width of at least a portion of said annular groove to be increased and also responsive to an increase in the normal spacing between said bearing surfaces to decrease the width of at least a portion of said annular groove whereby the quantity of fluid flowing through said groove adjacent to the segment of said bearing surfaces wherein the change of the normal spacing therebetween occurs tends to return said second bearing surface to its normal position to thus maintain the normal spacing between said surfaces.

7. An externally pressurized fluid bearing for maintaining bearing surfaces out of metal-to-metal contact and for stabilizing the spacing between said surfaces in response to the application of a load to the bearing including the combination of, a first bearing surface, a second bearing surface parallel to and having a normal spacing with respect to said first surface, said second bearing surface having a predetermined length, a bearing member associated with said second bearing surface and defining an annular passageway having a predetermined depth and oriented at right angles to said bearing surfaces, said passageway encompassing said second bearing surface, said bearing member including annular resilient means, positioned to said annular passageway, for altering the restriction to fluid flow provided by a segment of said passageway in response to an alteration of the normal spacing between said bearing surfaces, an annular reservoir of fluid lubricant connected to said annular passageway and co-extensive with said annular passageway, and means supplying a fluid under pressure to said reservoir whereby an alteration in the normal spacing between said bearing surfaces causes a change in the pressure therebetween so that a change in the pressure differential between said reservoir and said bearing surfaces reacts on said resilient means to control the fluid flow through said passageway in a manner appropriate to restore said first bearing surface to its normal position.

8. A fluid pressurized bearing including the combination of, a rotatable surface, a first bearing member having a first surface parallel to and encompassing a first portion of said rotatable surface and in spaced relationship therewith, a second bearing member in spaced relationship with said rotatable surface and juxtaposed to said first bearing member and having a second surface parallel to and encompassing a second portion of said rotatable surface, said second bearing member having a circumferential chamber disposed radially from said second surface and connectable to a source of fluid under pressure, an annular passageway between said first and second surfaces and extending radially between said first and second members, said passageway connecting said chamber with the space between said rotatable surface and said first and second surfaces of said first and second members, the spacing between said rotatable surface and said first and second surfaces being of such dimension that when the rotatable surface is centrally disposed between said first and second surfaces a minimum of resistance to the flow of fluid, with consequent relatively rapid flow of fluid within the adjacent section of the passageway, and low lateral pressure exists therein, and when the rotatable shaft is non-centrally disposed between said first and second surfaces the flow of fluid within said spacing is such as to provide a greatly increased resistance to the flow of fluid with consequent slowing down of the flow of fluid within the adjacent section of the passageway and the buildup of relatively large lateral pressure therein, one of said members including an annular resilient member forming a portion of said passageway whereupon the buildup of such large pressure in one section of the passageway results in said resilient member being deflected laterally to increase the lateral area of the passageway section, thereby enabling the direct application of the higher pressures within the chamber directly against the rotating surface to urge it toward center.

References Cited in the file of this patent

UNITED STATES PATENTS

| | | |
|---|---|---|
| 2,719,065 | Hornbostel | Sept. 27, 1955 |
| 2,756,114 | Brunzel | July 24, 1956 |